United States Patent
Takeuchi et al.

(10) Patent No.: US 9,876,634 B2
(45) Date of Patent: Jan. 23, 2018

(54) TRANSMISSION DEVICE, RECEPTION DEVICE, AND TRANSMISSION/RECEPTION SYSTEM

(71) Applicant: THINE ELECTRONICS, INC., Tokyo (JP)

(72) Inventors: Ryo Takeuchi, Tokyo (JP); Satoshi Miura, Tokyo (JP)

(73) Assignee: THINE ELECTRONICS, INC., Tokyo (JP)

(*) Notice: Subject to any disclaimer, the term of this patent is extended or adjusted under 35 U.S.C. 154(b) by 0 days.

(21) Appl. No.: 15/303,582

(22) PCT Filed: Mar. 11, 2015

(86) PCT No.: PCT/JP2015/057154
§ 371 (c)(1),
(2) Date: Oct. 12, 2016

(87) PCT Pub. No.: WO2015/159615
PCT Pub. Date: Oct. 22, 2015

(65) Prior Publication Data
US 2017/0033920 A1    Feb. 2, 2017

(30) Foreign Application Priority Data
Apr. 14, 2014   (JP) .................... 2014-082785

(51) Int. Cl.
*H04L 7/00* (2006.01)
*H04L 7/08* (2006.01)
(Continued)

(52) U.S. Cl.
CPC ............... *H04L 7/08* (2013.01); *H04N 5/04* (2013.01); *H04N 21/436* (2013.01)

(58) Field of Classification Search
CPC ........................................................ H04L 7/08
(Continued)

(56) References Cited

U.S. PATENT DOCUMENTS

2014/0003794 A1    1/2014   Hoshino et al.

FOREIGN PATENT DOCUMENTS

EP    2421262 A2    2/2012
JP    05-175950 A   7/1993
(Continued)

OTHER PUBLICATIONS

International Preliminary Report on Patentability, dated Oct. 27, 2016, from the International Bureau in counterpart International application No. PCT/JP2015/057154.
(Continued)

*Primary Examiner* — Lihong Yu
(74) *Attorney, Agent, or Firm* — Sughrue Mion, PLLC

(57) ABSTRACT

A transmission/reception system 1 includes a transmission device 10 configured to transmit image data and a reception device 20 configured to receive the image data transmitted from the transmission device 10. The transmission device 10 includes a serializer 11, an encoding unit 12, a data buffering unit 13, a data selection unit 14, a counter 15, and a synchronization signal generation unit 16. The data buffering unit 13 buffers data every n bits in synchronization with the clock. The data selection unit 14 outputs m-bit data selected from the data buffered by the data buffering unit 13 on the basis of a count value from the counter 15.

3 Claims, 7 Drawing Sheets

(51) Int. Cl.
*H04N 21/436* (2011.01)
*H04N 5/04* (2006.01)

(58) Field of Classification Search
USPC .......................................... 375/355
See application file for complete search history.

(56) References Cited

FOREIGN PATENT DOCUMENTS

| | | | |
|---|---|---|---|
| JP | 2001-352314 | A | 12/2001 |
| JP | 2007-035263 | A | 2/2007 |
| JP | 2009-135801 | A | 6/2009 |
| WO | 2012/157650 | A1 | 11/2012 |

OTHER PUBLICATIONS

Communication dated Mar. 21, 2017 from the Japanese Patent Office in counterpart Japanese application No. 2014-082785.
International Search Report, dated Jun. 2, 2015, from the International Bureau in counterpart International application No. PCT/JP2015/057154.
Communication dated Oct. 20, 2017, from European Patent Office in counterpart application No. 15779958.6.

TRANSMISSION DEVICE, RECEPTION DEVICE, AND TRANSMISSION/RECEPTION SYSTEM

CROSS REFERENCE TO RELATED APPLICATIONS

This application is a National Stage of International Application No. PCT/JP2015/057154, filed Mar. 11, 2015, claiming priority based on Japanese Patent Application No. 2014-082785, filed Apr. 14, 2014, the contents of all of which are incorporated herein by reference in their entirety.

TECHNICAL FIELD

The present invention relates to a transmission device, a reception device, and a transmission/reception system.

BACKGROUND ART

A transmission/reception system which transmits image data for displaying an image on an image display device such as a liquid crystal display device is disclosed in Patent Literature 1. The transmission/reception system 2 disclosed in this literature includes a transmission device 10A which transmits image data and a reception device 20A which receives the image data transmitted from the transmission device 10A and causes the image display device to display the image as illustrated in FIG. 1.

The transmission device 10A includes a serializer 11 and an encoding unit 12. The encoding unit 12 encodes image data (parallel data) to be transmitted. The serializer 11 converts the encoded parallel data into serial data and transmits serial data in which the clock is embedded to the reception device 20A.

The reception device 20A which receives data transmitted from the transmission device 10A includes a deserializer 21 and a decoding unit 22. The deserializer 21 recovers serial data and a clock on the basis of the received data and converts the serial data into parallel data. The decoding unit 22 reproduces image data by decoding the parallel data. Technology for recovering serial data and a clock on the basis of the received data in the reception device is referred to as CDR (clock data recovery).

Compared to transmission of parallel data, a transmission/reception system which adopts this CDR technology to transmit serial data can further reduce the number of transmission paths for data transmission and further reduce an area of a substrate connected to the transmission path. Also, this transmission/reception system can eliminate a problem of skew between data and a clock in principle and transmit high-speed and large-volume data because data in which a clock is embedded is transmitted.

A level of serial data to be transmitted from the transmission device to the reception device needs to transition at a high frequency in order for the data and the clock to be correctly recovered in the reception device. In order to assure high-frequency level transition in serial data to be transmitted, an encoding process is performed in the transmission device and a decoding process corresponding to the encoding process is performed in the reception device. The encoding process to be used here is, for example, an 8B10B encoding process, a scramble process, or the like.

Data (specific data) having a specific bit string for achieving synchronization of communication between the transmission device and the reception device is transmitted from the transmission device to the reception device so that the reception device correctly performs the decoding process on serial data encoded in the transmission device. In the conventional transmission/reception system, specific data is transmitted at a predetermined timing on the basis of a data enable signal (DE signal). The DE signal has a first level (e.g., H level) in a period in which valid data (image data) is transmitted and has a second level (e.g., L level) in a period in which invalid data (blanking data) is transmitted. Specific data can be transmitted at the timing of level transition of the DE signal. The specific data may be transmitted for every bit of the image data, the specific data may be transmitted for every two or more bits of the image data, and the specific data may be transmitted for every frame of the image data.

CITATION LIST

Patent Literature

[Patent Literature 1] Japanese Unexamined Patent Publication No. 2009-135801

SUMMARY OF INVENTION

Technical Problem

When serial data is transmitted from the transmission device to the reception device through a transmission path in the above-described transmission/reception system, noise may temporarily overlap the serial data due to an external factor such as static electricity. Due to this noise, synchronization between the encoding process in the transmission device and the decoding process in the reception device may be lost. If the synchronization is temporarily lost even when the noise is temporary, synchronization remains lost until the specific data is transmitted thereafter and correct data transmission/reception is impossible. As a result, in the image display device, in the case of a moving image, a screen flickers, and in the case of a still image, a part in which a correct image is not displayed is shown on the screen, and impediment on image display appears conspicuously. In particular, when the synchronization signal serves the function of the DE signal as in FIG. 1, the DE signal cannot be recovered when the specific data is damaged by noise, one line of image data is lost, and impediment on image display appears even more conspicuously.

FIG. 2 is a diagram illustrating a problem in image display based on serial data when noise temporarily overlaps the serial data transmitted from the transmission device to the reception device through a transmission path. FIG. 2 illustrates the case in which specific data is transmitted for every line of image data. In this case, in a certain frame, pixels from a certain pixel of a certain row overlapped by noise to a pixel of the end of the row become a part in which a correct image is not displayed (a hatching region in FIG. 2). In FIG. 2, specific data is schematically illustrated as a blanking start (BS) indicating the start of an invalid period (a blanking period) of an image and a blanking end (BE) indicating the end of the blanking period.

Also, the problem of synchronization loss is present when data is generally encoded and transmitted as well as when image data is transmitted.

The present invention has been made to solve the above-described problem and an objective of the present invention is to provide a transmission device, a reception device, and a transmission/reception system capable of recovering synchronization between a transmission device and a reception device early when synchronization between an encoding process in the transmission device and a decoding process in the reception device is lost due to noise.

Solution to Problem

A transmission device of the present invention is a transmission device for transmitting serial data in which a clock is embedded, the transmission device including: (1) a counter configured to count a pulse of the clock; (2) a synchronization signal generation unit configured to generate a synchronization signal of a cycle (P+Q) having a first level in a P cycle period of the clock and having a second level in a Q cycle period continuous to the P cycle period on the basis of a count value from the counter; (3) a data buffering unit configured to input and buffer data every n bits in synchronization with the clock; (4) a data selection unit configured to output m-bit data selected from the data buffered by the data buffering unit on the basis of the count value from the counter, (5) an encoding unit configured to read m-bit data from the data buffering unit in synchronization with the clock in a period in which the synchronization signal has the first level, encode the data, output the encoded data, and output specific data in synchronization with the clock in a period in which the synchronization signal has the second level; and (6) a serializer configured to convert the data output from the encoding unit into serial data and transmit the serial data, wherein n, m, P, and Q are natural numbers, n<m, and n(P+Q)≤mP.

A reception device of the present invention is a reception device for receiving serial data in which a clock is embedded, the reception device including: (1) a deserializer configured to receive transmitted serial data, convert the serial data into parallel data, and output the parallel data in synchronization with the clock; (2) a decoding unit configured to determine whether the parallel data output from the deserializer is specific data, reproduce a synchronization signal of a cycle (P+Q) having a first level in a P cycle period in which the parallel data is not the specific data and having a second level in a Q cycle period in which the parallel data is the specific data, decode the parallel data in a period in which the synchronization signal has the first level, and output m-bit data after the decoding in synchronization with the clock; (3) a counter configured to count a pulse of the clock and initialize a count value in every cycle of the synchronization signal; (4) a data buffering unit configured to input the m-bit data output from the decoding unit in synchronization with the clock and buffer the input data; and (5) a data selection unit configured to output n-bit data selected from the data buffered by the data buffering unit on the basis of the count value from the counter, wherein n, m, P, and Q are natural numbers, n<m, and n(P+Q)≤mP.

A transmission/reception system of the present invention includes the transmission device of the present invention configured to transmit the data; and the reception device of the present invention configured to receive the data transmitted from the transmission device.

Advantageous Effects of Invention

According to the present invention, it is possible to recover synchronization between a transmission device and a reception device early when synchronization between an encoding process in the transmission device and a decoding process in the reception device is lost due to noise.

Figure 4:
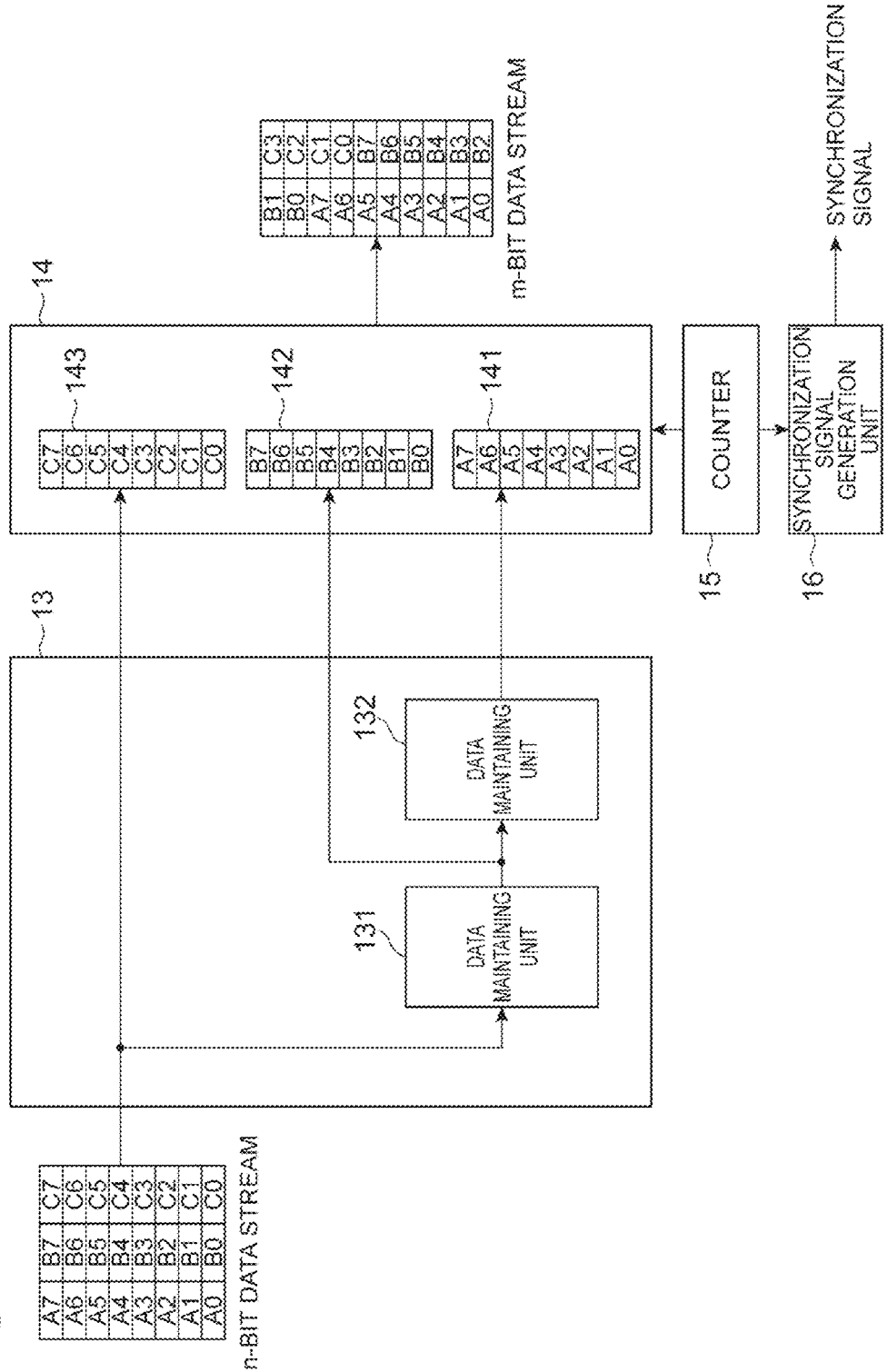

FIG. 4 is a diagram illustrating configurations of a data buffering unit 13 and a data selection unit 14 of a transmission device 10.

Figure 5:
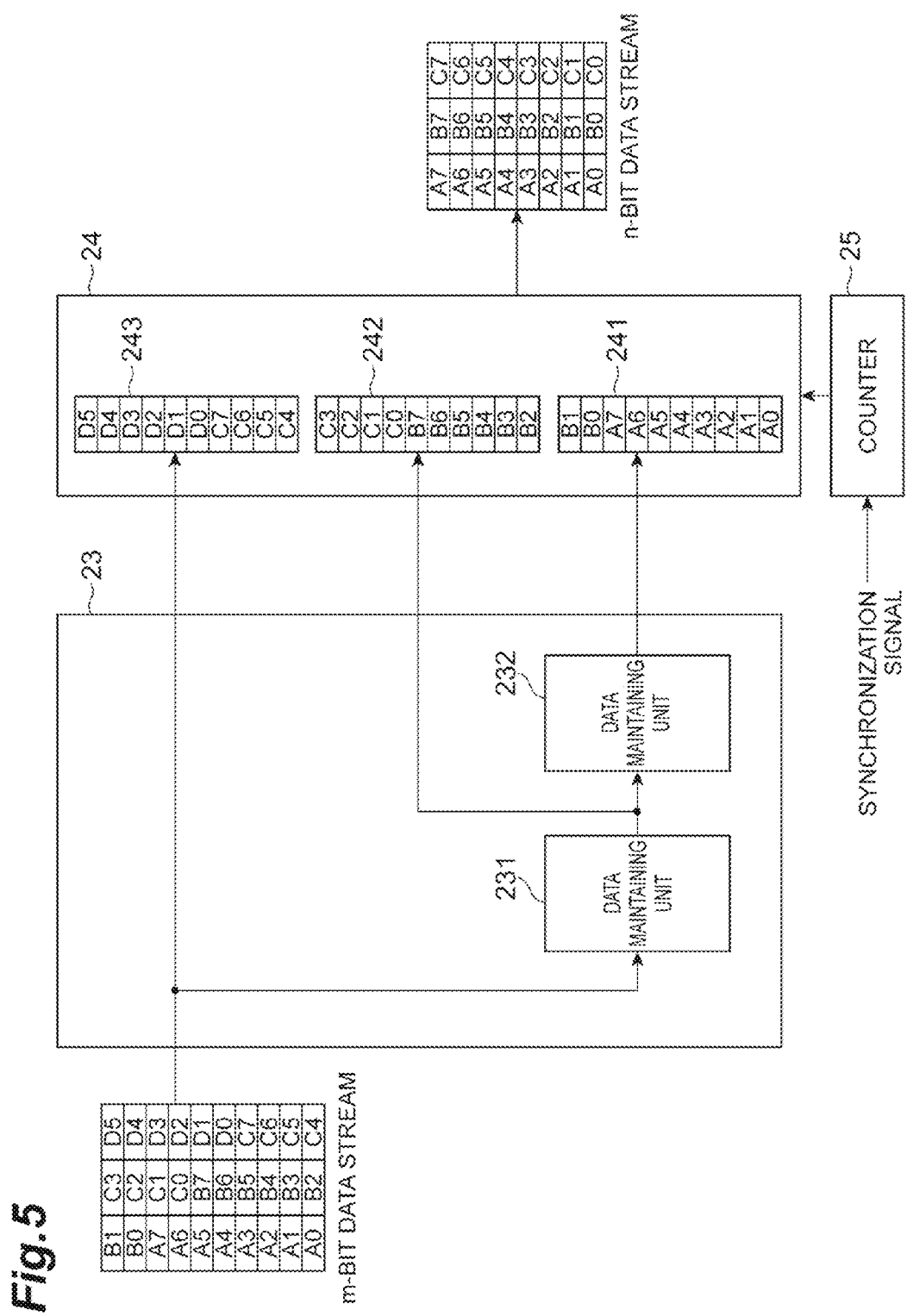

FIG. 5 is a diagram illustrating configurations of a data buffering unit 23 and a data selection unit 24 of a reception device 20.

FIGS. 6(a) to 6(e) are diagrams illustrating signals and data in the transmission/reception system 1 of the present embodiment.

Figure 7:
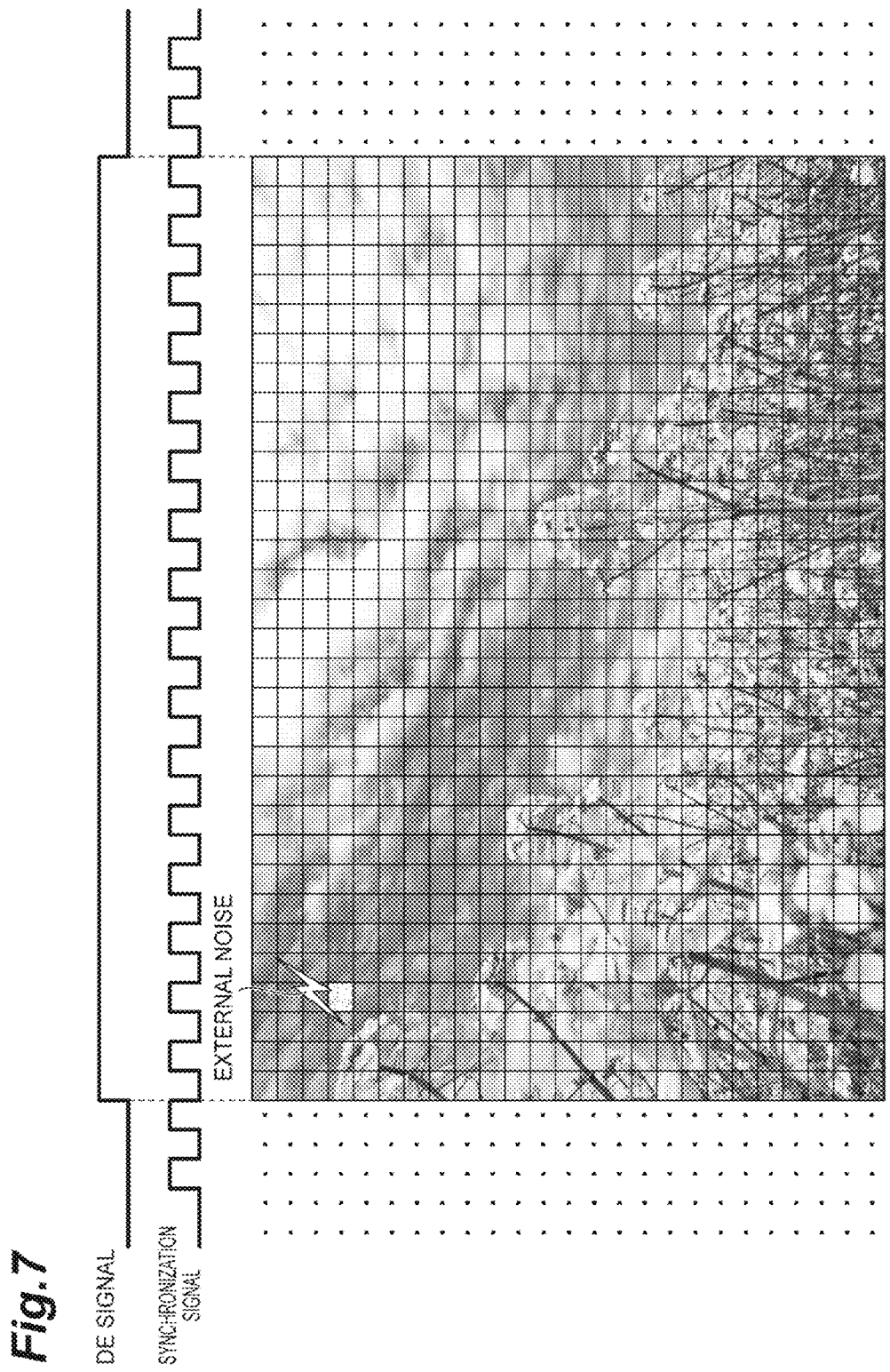

FIG. 7 is a diagram illustrating an example of image display in the transmission/reception system 1 of the present embodiment.

DESCRIPTION OF EMBODIMENTS

Hereinafter, modes for carrying out the present invention will be described in detail with reference to the accompanying drawings. The same elements are denoted by the same reference signs in the description of the drawings and redundant description thereof will be omitted.

Figure 1:
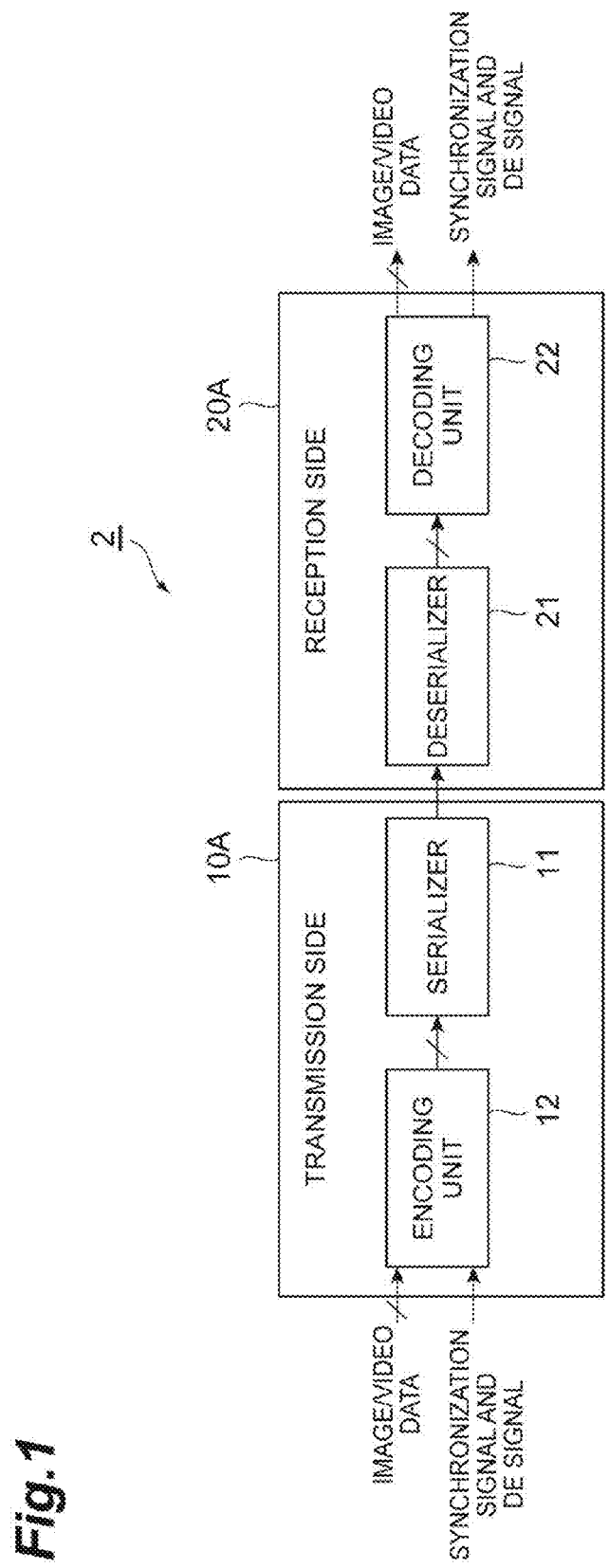
FIG. 1 is a diagram illustrating a configuration of a transmission/reception system 2 of a comparative example.
Figure 2:
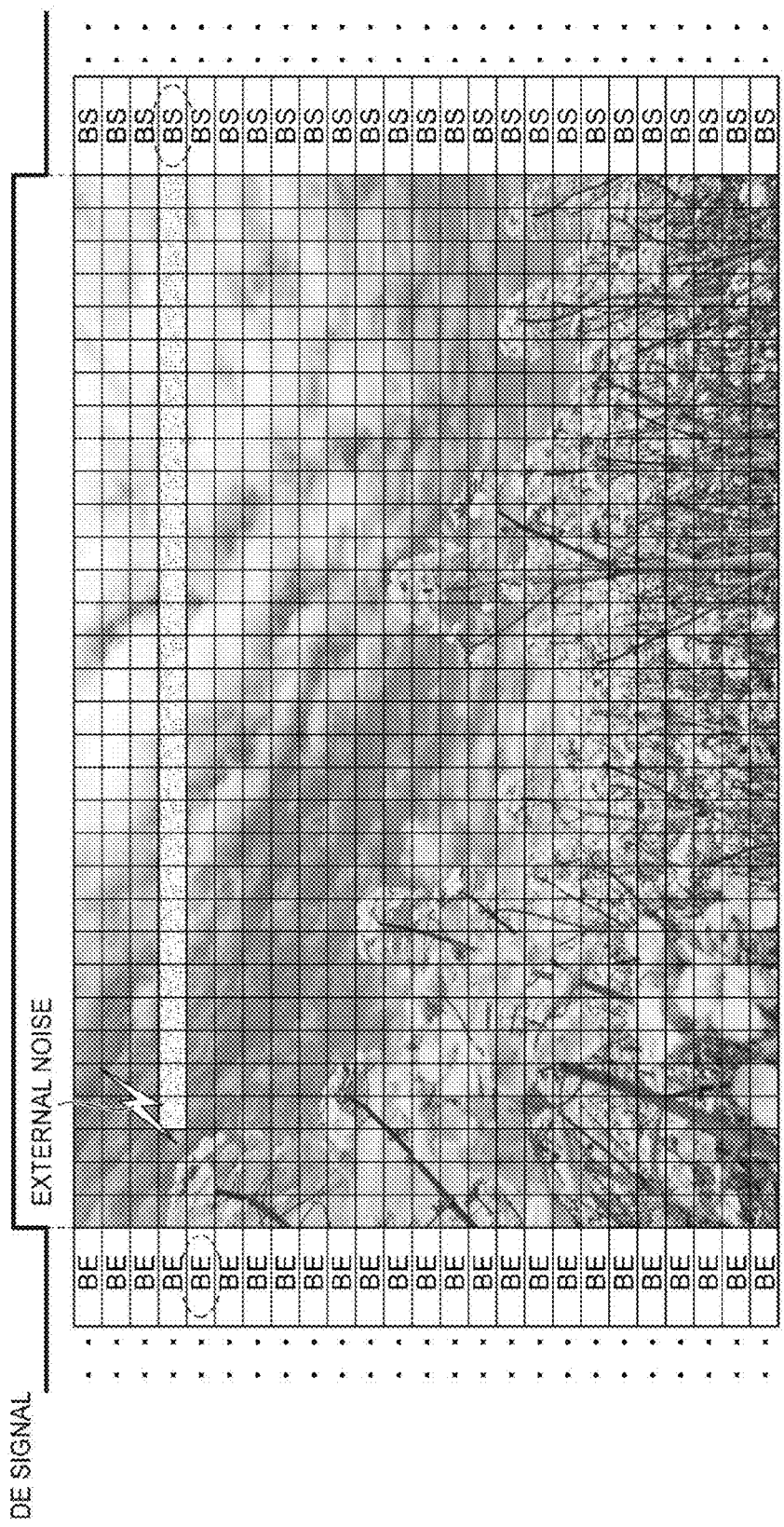
FIG. 2 is a diagram illustrating a problem in image display in the transmission/reception system 2 of the comparative example.
Figure 3:
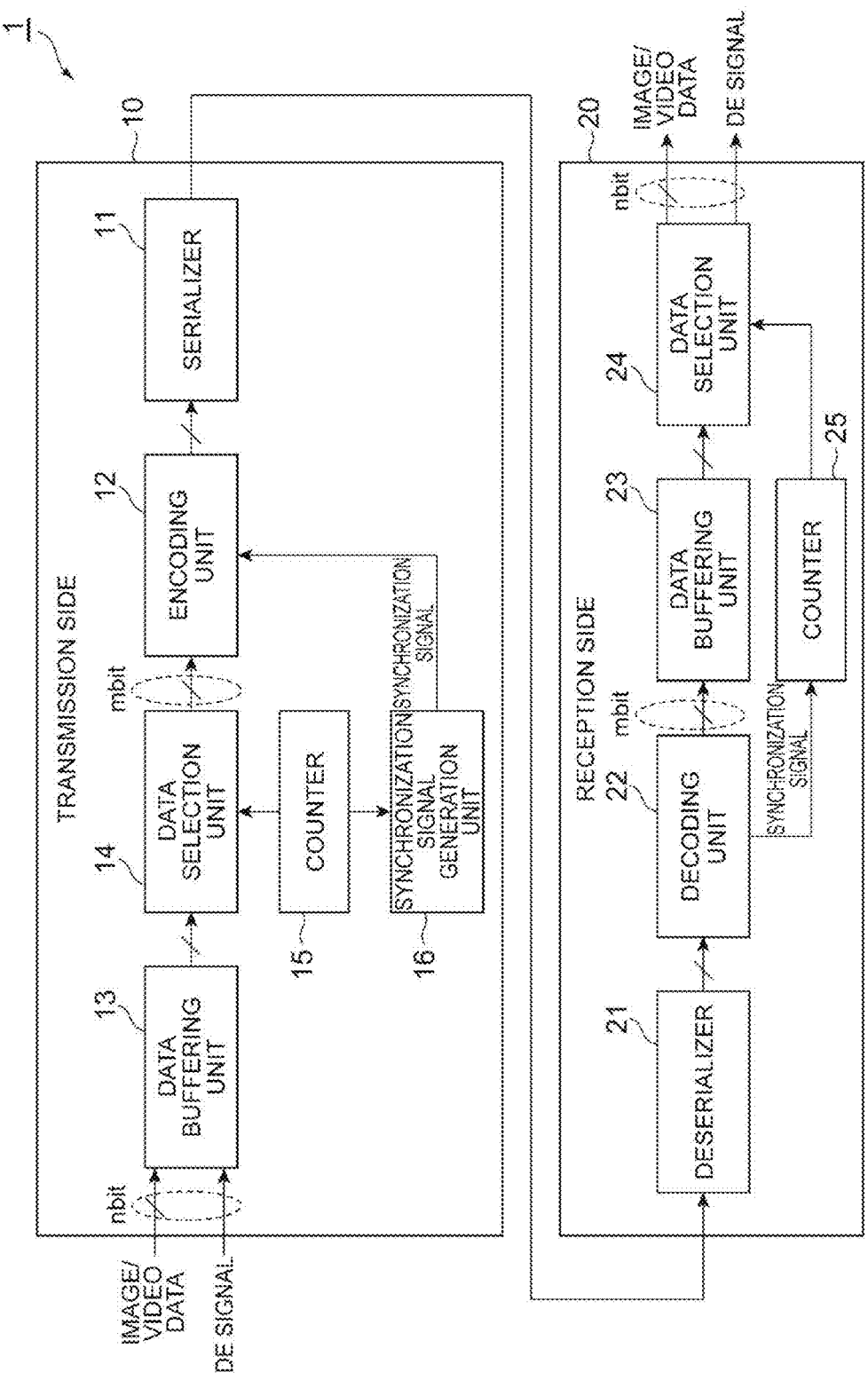
FIG. 3 is a diagram illustrating a configuration of a transmission/reception system 1 of the present embodiment.

FIG. 3 is a diagram illustrating a configuration of a transmission/reception system 1 of the present embodiment. The transmission/reception system 1 includes a transmission device 10 which transmits image data and a reception device 20 which receives the image data transmitted from the transmission device 10. Data transmitted from the transmission device 10 to the reception device 20 is serial data in which a clock is embedded.

The transmission device 10 inputs data to be transmitted to the reception device 20, inputs a clock, performs a process synchronized with the clock, and generates and transmits serial data in which the clock is embedded. The transmission device 10 includes a serializer 11, an encoding unit 12, a data buffering unit 13, a data selection unit 14, a counter 15, and a synchronization signal generation unit 16.

The counter 15 counts a pulse of the clock. The synchronization signal generation unit 16 generates a synchronization signal of a cycle (P+Q) on the basis of a count value from the counter 15. A P cycle period in which the synchronization signal has a first level (e.g., H level) and a Q cycle period in which the synchronization signal has a second level (e.g., L level) are alternately iterated. A one-cycle period is a period of one cycle of the clock.

The data buffering unit 13 inputs and buffers data every n bits in synchronization with the clock. Data input to the data buffering unit 13 includes invalid data (blanking data) in addition to valid data (image data) and a DE signal for identifying the valid data and the invalid data. The data selection unit 14 outputs m-bit data selected from the data buffered by the data buffering unit 13 on the basis of the count value from the counter 15. Also, the data buffering unit 13 and the data selection unit 14 will be described below in detail.

The encoding unit 12 reads m-bit data from the data buffering unit 13 in synchronization with the clock in a period in which the synchronization signal has the first level, encodes the data, and outputs the encoded data. An encoding process used here is, for example, a Manchester encoding process, an 8B10B encoding process, a scramble process, or the like. Also, the encoding unit 12 outputs specific data in synchronization with a clock in a period in which the synchronization signal has the second level. The specific data has a specific bit string different from the encoded data. The serializer 11 converts data (the encoded data and the specific data) output from the encoding unit 12 into serial data and transmits the serial data to the reception device 20.

Also, n, m, P, and Q are natural numbers, n<m, and n(P+Q)≤mP. Preferably, n(P+Q)=mP.

The reception device 20 receives serial data in which a clock is embedded from the transmission device 10. The reception device 20 includes a deserializer 21, a decoding unit 22, a data buffering unit 23, a data selection unit 24, and a counter 25.

The deserializer 21 receives serial data transmitted from the transmission device 10, recovers a clock embedded in the received serial data, and outputs a clock obtained by dividing the recovered clock. Also, the deserializer 21 converts the received serial data into parallel data and outputs the parallel data in synchronization with the clock.

The decoding unit 22 determines whether parallel data output from the deserializer 21 is specific data and reproduces a synchronization signal of a cycle (P+Q) on the basis of a determination result. This synchronization signal has a first level in a P cycle period in which the parallel data is not the specific data and has a second level in a Q cycle period in which the parallel data is the specific data. Also, the decoding unit 22 decodes the parallel data in a period in which the synchronization signal has the first level and outputs m-bit data after the decoding in synchronization with the clock. A decoding process in the decoding unit 22 corresponds to the encoding process in the encoding unit 12 of the transmission device 10 and is performed in synchronization with the encoding process.

The counter 25 counts a pulse of the clock output from the deserializer 21 and initializes a count value in every cycle of the synchronization signal output from the decoding unit 22. The data buffering unit 23 inputs and buffers m-bit data output from the decoding unit 22 in synchronization with the clock. The data selection unit 24 outputs n-bit data selected from the data buffered by the data buffering unit 23 on the basis of the count value from the counter 25. Also, the data buffering unit 23 and the data selection unit 24 will be described below in detail.

FIG. 4 is a diagram illustrating configurations of the data buffering unit 13 and the data selection unit 14 of the transmission device 10. In FIG. 4, the counter 15 and the synchronization signal generation unit 16 are also illustrated. Also, in FIG. 4, n-bit data input to the data buffering unit 13 is schematically illustrated and m-bit data output from the data selection unit 14 is schematically illustrated. Here, n=8 and m=10.

The data buffering unit 13 includes data maintaining units 131 and 132 which are connected in series and maintain n-bit data in synchronization with the clock. The data selection unit 14 includes storage units 141 to 143 which store n-bit data. The storage unit 141 stores n-bit data maintained by the data maintaining unit 132 of the data buffering unit 13. The storage unit 142 stores n-bit data maintained by the data maintaining unit 131 of the data buffering unit 13. The storage unit 143 stores n-bit data input to the data buffering unit 13.

That is, the storage unit 141 can store n-bit data [A0 to A7], the storage unit 142 can store n-bit data [B0 to B7] subsequent to the n-bit data [A0 to A7], and the storage unit 143 can further subsequently store n-bit data [C0 to C7]. The data selection unit 14 outputs m-bit data [A0 to A7, B0, B1] and subsequently outputs m-bit data [B2 to B7, C0 to C3] on the basis of data stored by the storage units 141 to 143.

FIG. 5 is a diagram illustrating configurations of the data buffering unit 23 and the data selection unit 24 of the reception device 20. In FIG. 5, the counter 25 is also illustrated. Also, in FIG. 5, m-bit data input to the data buffering unit 23 is schematically illustrated and n-bit data output from the data selection unit 24 is schematically illustrated. Here, n=8 and m=10.

The data buffering unit 23 includes data maintaining units 231 and 232 which are connected in series and maintain m-bit data in synchronization with the clock. The data selection unit 24 includes storage units 241 to 243 which store m-bit data. The storage unit 241 stores m-bit data maintained by the data maintaining unit 232 of the data buffering unit 23. The storage unit 242 stores m-bit data maintained by the data maintaining unit 231 of the data buffering unit 23. The storage unit 243 stores m-bit data input to the data buffering unit 23.

That is, the storage unit 241 can store m-bit data [A0 to A7, B0, B1], the storage unit 242 can store m-bit data [B2 to B7, C0 to C3] subsequent to the m-bit data [A0 to A7, B0, B1], and the storage unit 243 can further subsequently store m-bit data [C4 to C7, D0 to D5]. The data selection unit 24 outputs n-bit data [A0 to A7], subsequently outputs n-bit data [B0 to B7], and further subsequently outputs n-bit data [C0 to C7] on the basis of data stored by the storage units 241 to 243.

Figure 6:
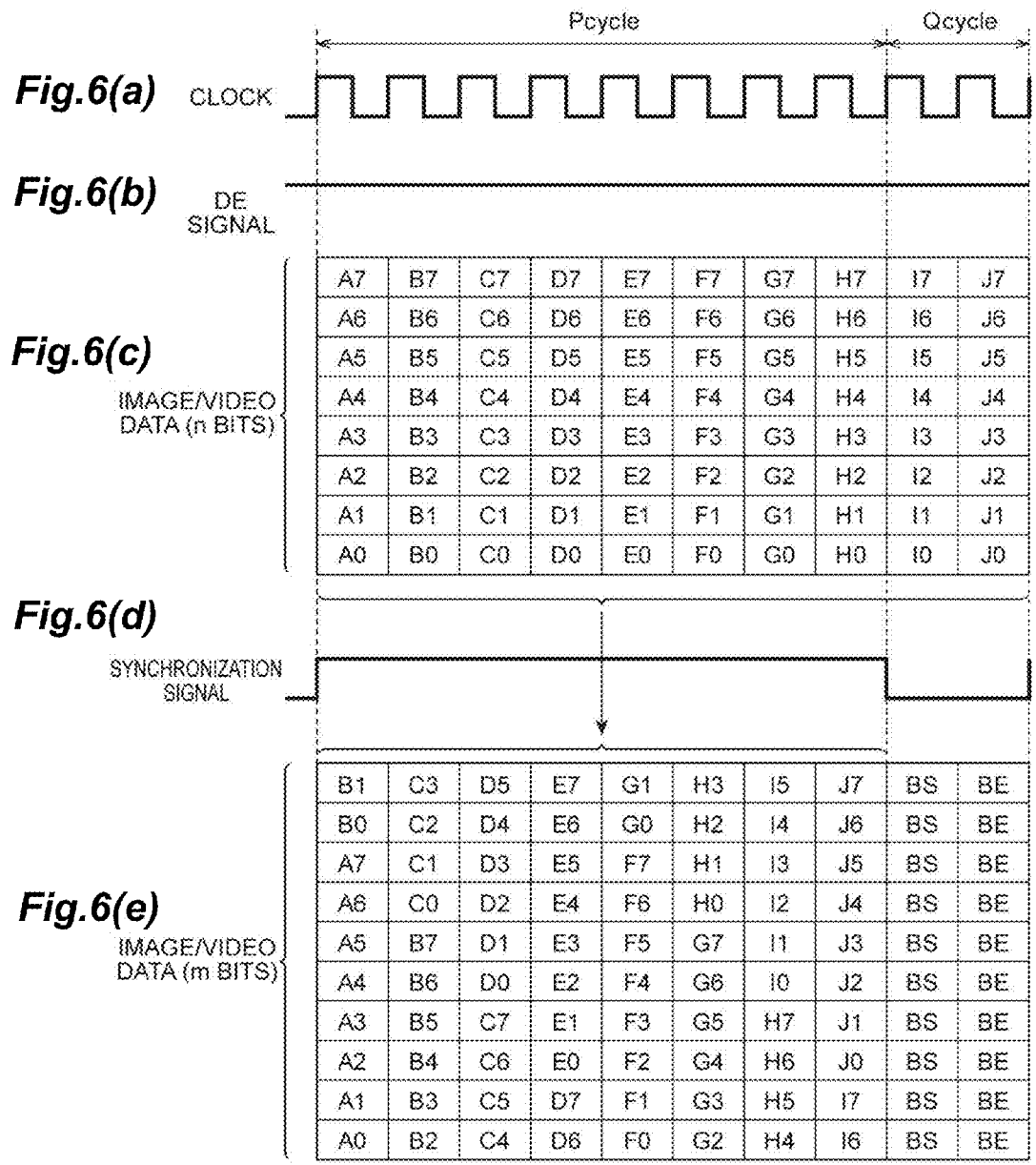

FIGS. 6(*a*) to 6(*e*) are diagrams illustrating signals and data in the transmission/reception system 1 of the present embodiment. FIG. 6(*a*) illustrates a clock, FIG. 6(*b*) illustrates a DE signal, FIG. 6(*c*) illustrates n-bit data, FIG. 6(*d*) illustrates a synchronization signal, and FIG. 6(*e*) illustrates m-bit data. Here, n=8 and m=10. Also, P=8 and Q=2.

In a period in which m-bit data (FIG. 6(*c*)) input in synchronization with a clock (FIG. 6(*a*)) is valid data (image data) in the transmission device 10, the DE signal (FIG. 6(*b*)) has the H level. A synchronization signal (FIG. 6(*d*)) of a cycle (P+Q) generated by the synchronization signal generation unit 16 has the H level in the P cycle period and has the L level in the Q cycle period. m-bit data (FIG. 6(*e*)) output from the data selection unit 14 is image data (denoted by A0 to J7 in FIG. 6(*c*)) in a P cycle period in which the synchronization signal has the H level and is specific data (denoted by BS and BE in FIG. 6(*e*)), not image data, in a Q cycle period in which the synchronization signal has the L level.

In the reception device 20, it is possible to recover the clock, the DE signal, and the synchronization signal on the basis of the received data according to a process opposite to the process of the transmission device 10, identify image data and specific data, and acquire n-bit data.

When relationships of n<m and n(P+Q)≤mP among n, m, P, and Q are satisfied, the image data can be transmitted in the P cycle period in which the synchronization signal has the H level, and the specific data can be transmitted in the Q cycle period in which the synchronization signal has the L level. That is, even within a valid data period in which the DE signal has the H level and image data is transmitted, it is possible to transmit the specific data in the cycle (P+Q).

By using the timing of transmission/reception of the specific data, it is possible to achieve synchronization between the encoding process in the encoding unit 12 of the transmission device 10 and the decoding process in the decoding unit 22 of the reception device 20. Even when synchronization between the encoding process in the encoding unit 12 of the transmission device 10 and the decoding process in the decoding unit 22 of the reception device 20 is lost due to noise, it is possible to recover the synchronization between the processes early.

FIG. 7 is a diagram illustrating an example of image display in the transmission/reception system 1 of the present embodiment. As illustrated in FIG. 7, when noise temporarily overlaps serial data transmitted from the transmission device 10 to the reception device 20 through the transmission path, display is disturbed until specific data is transmitted the next time from a certain pixel of a certain row overlapped by noise in a certain frame. Because the synchronization between the encoding process in the encoding unit 12 of the transmission device 10 and the decoding process in the decoding unit 22 of the reception device 20 is recovered according to transmission of the specific data, normal display may be performed after the transmission of the specific data. Therefore, flickering or the like of a screen is reduced and quality of image display is improved.

Also, the case in which data transmitted from the transmission device to the reception device is image data has been described in the above-described embodiment. However, the present invention can also be applied to a transmission/reception system which achieves synchronization between an encoding process of a transmission side and a decoding process of a reception side when encoded data is generally transmitted as serial data.

INDUSTRIAL APPLICABILITY

The present invention can be applied to a transmission device, a reception device, and a transmission/reception system capable of recovering synchronization between a transmission device and a reception device early when synchronization between an encoding process in the transmission device and a decoding process in the reception device is lost due to noise.

REFERENCE SIGNS LIST

1 Transmission/reception system
10 Transmission device
11 Serializer
12 Encoding unit
13 Data buffering unit
14 Data selection unit
15 Counter
16 Synchronization signal generation unit
20 Reception device
21 Deserializer
22 Decoding unit
23 Data buffering unit
24 Data selection unit
25 Counter

The invention claimed is:

1. A transmission device for transmitting serial data in which a clock is embedded, the transmission device comprising:
a counter configured to count a pulse of the clock;
a synchronization signal generation unit configured to generate a synchronization signal of a cycle (P+Q) having a first level in a P cycle period of the clock and having a second level in a Q cycle period continuous to the P cycle period on the basis of a count value from the counter;
a data buffering unit configured to input and buffer data every n bits in synchronization with the clock;
a data selection unit configured to output m-bit data selected from the data buffered by the data buffering unit on the basis of the count value from the counter;
an encoding unit configured to read m-bit data from the data buffering unit in synchronization with the clock in a period in which the synchronization signal has the first level, encode the data, output the encoded data, and output specific data in synchronization with the clock in a period in which the synchronization signal has the second level; and
a serializer configured to convert the data output from the encoding unit into serial data and transmit the serial data,
wherein n, m, P, and Q are natural numbers, n<m, and n(P+Q)≤mP.

2. A reception device for receiving serial data in which a clock is embedded, the reception device comprising:
a deserializer configured to receive transmitted serial data, convert the serial data into parallel data, and output the parallel data in synchronization with the clock;
a decoding unit configured to determine whether the parallel data output from the deserializer is specific data, reproduce a synchronization signal of a cycle (P+Q) having a first level in a P cycle period in which the parallel data is not the specific data and having a second level in a Q cycle period in which the parallel data is the specific data, decode the parallel data in a period in which the synchronization signal has the first level, and output m-bit data after the decoding in synchronization with the clock;
a counter configured to count a pulse of the clock and initialize a count value in every cycle of the synchronization signal;
a data buffering unit configured to input the m-bit data output from the decoding unit in synchronization with the clock and buffer the input data; and
a data selection unit configured to output n-bit data selected from the data buffered by the data buffering unit on the basis of the count value from the counter,
wherein n, m, P, and Q are natural numbers, n<m, and n(P+Q)≤mP.

3. A transmission/reception system comprising:
the transmission device according to claim 1 configured to transmit the data; and
a reception device configured to receive the data transmitted from the transmission device,
wherein said reception device is a device for receiving serial data in which a clock is embedded, and comprises:
a deserializer configured to receive transmitted serial data, convert the serial data into parallel data, and output the parallel data in synchronization with the clock;
a decoding unit configured to determine whether the parallel data output from the deserializer is specific data, reproduce a synchronization signal of a cycle (P+Q) having a first level in a P cycle period in which the parallel data is not the specific data and having a second level in a Q cycle period in which the parallel data is the specific data, decode the parallel data in a period in which the synchronization signal has the first level, and output m-bit data after the decoding in synchronization with the clock;
a counter configured to count a pulse of the clock and initialize a count value in every cycle of the synchronization signal;

a data buffering unit configured to input the m-bit data output from the decoding unit in synchronization with the clock and buffer the input data; and a data selection unit configured to output n-bit data selected from the data buffered by the data buffering unit on the basis of the count value from the counter, and wherein n, m, P, and Q are natural numbers, n<m, and n(P+Q)≤mP.

* * * * *